United States Patent
Ryu et al.

(10) Patent No.: US 11,542,197 B2
(45) Date of Patent: Jan. 3, 2023

(54) TEXTILE-REINFORCED CEMENT COMPOSITE FOR SUPPRESSING OCCURRENCE OF SLIPPING AND CRACK AND METHOD OF MANUFACTURING THE SAME

(71) Applicant: KOREA INSTITUTE OF CIVIL ENGINEERING AND BUILDING TECHNOLOGY, Gyeonggi-do (KR)

(72) Inventors: Gum Sung Ryu, Gyeonggi-do (KR); Kyung Taek Koh, Gyeonggi-do (KR); Hyeong Yeol Kim, Gyeonggi-do (KR); Gi Hong An, Gyeonggi-do (KR); Dong Woo Seo, Gyeonggi-do (KR); Seung Seop Jin, Incheon (KR)

(73) Assignee: KOREA INSTITUTE OF CIVIL ENGINEERING AND BUILDING TECHNOLOGY, Gyeonggi-Do (KR)

(*) Notice: Subject to any disclaimer, the term of this patent is extended or adjusted under 35 U.S.C. 154(b) by 192 days.

(21) Appl. No.: 16/702,466

(22) Filed: Dec. 3, 2019

(65) Prior Publication Data
US 2021/0070657 A1    Mar. 11, 2021

(30) Foreign Application Priority Data
Sep. 9, 2019    (KR) .......................... 10-2019-0111410

(51) Int. Cl.
*C04B 14/06* (2006.01)
*C04B 14/42* (2006.01)
(Continued)

(52) U.S. Cl.
CPC .......... *C04B 16/0633* (2013.01); *B28B 23/02* (2013.01); *C04B 14/06* (2013.01);
(Continued)

(58) Field of Classification Search
CPC ... C04B 16/0633; C04B 14/06; C04B 18/146; C04B 14/42; C04B 16/0641;
(Continued)

(56) References Cited

U.S. PATENT DOCUMENTS 6,911,077 B2    6/2005    Zucker
9,862,641 B2    1/2018    Anast et al.
(Continued)

FOREIGN PATENT DOCUMENTS

KR    20040079629    9/2004
KR    20050018744    2/2005
(Continued)

OTHER PUBLICATIONS

KR-101772625-B1, machine translation (Year: 2017).*
(Continued)

*Primary Examiner* — Kevin E Yoon
*Assistant Examiner* — Marites A Guino-o Uzzle
(74) *Attorney, Agent, or Firm* — JCIPRNET

(57) ABSTRACT

Provided are a textile reinforced cement composite for suppressing occurrence of slipping and a crack and a manufacturing method thereof. The textile reinforced cement composite for suppressing occurrence of slipping and a crack can suppress slipping between a textile grid reinforcement and a cement composite by using an angulated filling material mixed therewith when a textile reinforced cement composite having a textile grid reinforcement embedded in a cement composite is manufactured, suppress occurrence of a crack of the cement composite, suppress occurrence of a crack of the cement composite due to a fiber bridging reaction by using organic fiber mixed therewith, induce distribution of fine cracks, suppress degradation of fluidity of the cement composite caused by mixing of the angulated filling material by using a spherical binder and a chemical
(Continued)

admixture added thereto, and suppress slipping between the textile grid reinforcement and the cement composite by using a fine powder binder having a predetermined particle size and mixed therewith.

13 Claims, 11 Drawing Sheets

(51) Int. Cl.

| | | |
|---|---|---|
| *C04B 16/06* | (2006.01) | |
| *C04B 18/08* | (2006.01) | |
| *C04B 18/14* | (2006.01) | |
| *C04B 28/10* | (2006.01) | |
| *B28B 23/02* | (2006.01) | |
| *C04B 14/22* | (2006.01) | |
| *C04B 28/18* | (2006.01) | |
| *C04B 111/34* | (2006.01) | |

(52) U.S. Cl.
CPC .............. *C04B 14/22* (2013.01); *C04B 14/42* (2013.01); *C04B 16/0625* (2013.01); *C04B 16/0641* (2013.01); *C04B 16/0691* (2013.01); *C04B 18/08* (2013.01); *C04B 18/146* (2013.01); *C04B 28/10* (2013.01); *C04B 28/18* (2013.01); *C04B 2111/343* (2013.01); *Y02W 30/91* (2015.05)

(58) Field of Classification Search
CPC ..... C04B 28/10; C04B 16/0691; C04B 18/08; C04B 2111/343; C04B 28/02; C04B 16/0625; C04B 14/22; C04B 28/18; C04B 14/38; C04B 22/00; C04B 18/02; C04B 18/021; C04B 16/06; C04B 24/00; C04B 28/00; C04B 18/14; B28B 23/02; E04C 5/16; E04C 5/07; D03D 25/00; D03D 9/00; Y02W 30/91

See application file for complete search history.

(56) References Cited

U.S. PATENT DOCUMENTS

| | | | | |
|---|---|---|---|---|
| 2009/0305019 | A1* | 12/2009 | Chanvillard | .......... C04B 22/008 |
| | | | | 428/220 |
| 2014/0326168 | A1* | 11/2014 | Tanaka | .................. C04B 20/008 |
| | | | | 106/816 |
| 2019/0071354 | A1* | 3/2019 | Guynn | .................... C04B 28/08 |

FOREIGN PATENT DOCUMENTS

| | | | |
|---|---|---|---|
| KR | 20050018744 | A * | 2/2005 |
| KR | 20120052544 | A * | 5/2012 |
| KR | 101207038 | | 11/2012 |
| KR | 101772625 | | 8/2017 |
| KR | 101772625 | B1 * | 8/2017 |
| KR | 101958243 | | 7/2019 |
| KR | 102003670 | | 7/2019 |

OTHER PUBLICATIONS

Mohammadreza Mirzahosseini, Kyle A. Riding, Influence of different particle sizes on reactivity of finely ground glass as supplementary cementitious material (SCM), Cement and Concrete Composites, vol. 56, 2015, pp. 95-105, ISSN 0958-9465, doi: 10.1016/j.cemconcomp.2014.10.004. (Year: 2015).*

KR-20120052544-A, machine translation (Year: 2012).*

KR-20050018744-A (Year: 2005).*

* cited by examiner

| Classification | | Cement composite | |
|---|---|---|---|
| | | Mixing ratio (parts by weight) | Remarks |
| Binder | Cement | 100 parts by weight | |
| | Spherical binder | 40 to 60 parts by weight | - Suppress degradation of fluidity of cement composite<br>- Fly ash, silica fume, lightweight bead etc. |
| | Fine powder binder | 10 to 30 parts by weight | - Suppress slipping between textile and cement composite<br>- average particle size of 2 to 10 μm<br>- Fine glass powder, fine silica powder, fine limestone powder, etc. |
| Filling material | General sand | 180 to 225 parts by weight | - 1~5 mm<br>- 60 to 75% of entirety of filling material |
| | Angulated filling material | 75 to 120 parts by weight | - Suppress occurrence of slipping and crack of cement composite<br>- Angulated sand or glass powders having distribution of grain shape of 45 to 52%<br>- 25 to 40 % of entirety of filling material |
| Mixing water (water) | | 55 to 75 parts by weight | |
| Organic fiber | | 0.5 to 2.5 parts by weight | - PVA, PP, PE, Glass, and Nylon<br>- Suppress occurrence of crack due to fiber bridging reaction and induce distribution of fine cracks |
| Chemical admixture | | 0.1 to 0.3 parts by weight | - Suppress degradation of fluidity of cement composite<br>- Superplasticizer, water reducing admixture, and high range water reducing admixture, etc. |
| Textile grid reinforcement | | - Embedded in cement composite<br>- Weaving of glass fiber, carbon fiber, aramid fiber, etc.<br>- Replace conventional reinforcement bar or reinforcement mesh | |

Textile reinforced cement composite (cement composite + textile grid reinforcement)

FIG. 7

Textile grid reinforcement

TEXTILE-REINFORCED CEMENT COMPOSITE FOR SUPPRESSING OCCURRENCE OF SLIPPING AND CRACK AND METHOD OF MANUFACTURING THE SAME

CROSS-REFERENCE TO RELATED APPLICATION

This application claims priority to and the benefit of Korean Patent Application No. 10-2019-0111410, filed on Sep. 9, 2019, the disclosure of which is incorporated herein by reference in its entirety.

BACKGROUND

1. Field of the Invention

The present invention relates to a textile-reinforced cement composite and, more specifically, to a textile-reinforced cement composite for suppressing slipping between a textile grid reinforcement and a cement composite and occurrence of a crack of the cement composite when a textile-reinforced cement composite formed by embedding the textile grid reinforcement in the cement composite is manufactured, and a method of manufacturing the same.

2. Discussion of Related Art

FIGS. 1A to 1C shows schematic views illustrating reinforcement bar reinforced concrete, fiber reinforced concrete, and textile reinforced concrete.

As shown in FIG. 1A, a reinforcement bar reinforced concrete 10 is formed by embedding reinforcement-bars in mortar/concrete 11, which is a cement composite, in a longitudinal direction and a transverse direction.

Further, as shown in FIG. 1B, the fiber reinforced concrete 20 is formed by mixing fiber, such as glass staple fiber 22, with mortar/concrete 21 which is a cement composite.

Further, as shown in FIG. 1C, the textile reinforced concrete 30 is formed by embedding a lattice-shaped textile grid reinforcement 32 in mortar/concrete 31 which is a cement composite.

Typically, the lattice-shaped grid is a reinforcement material used for retaining-wall reinforcement, slope reinforcement, ground reinforcement, and the like when civil engineering construction is conducted. The grid requires high tensile strength and low tensile strain (low ductility) for the purpose thereof in addition to properties such as constructability and a frictional property.

A method of manufacturing such a grid generally includes injection-molding or extruding a plastic material, punching the injection-molded or extruded plastic material at regular distances, and uniaxially or biaxially elongating the plastic material. However, the lattice-shaped grid using the injection-molded plastic has low tensile strength, is difficult to manufacture in series of processes, and has limitations in size or shape.

Recently, textile grid fabric is provided by weaving and knitting high strength fiber into a lattice-shaped textile, a surface of the textile grid fabric is coated with a resin coating solution such as polyvinyl chloride, bitumen, acryl, latex, rubber-based resin, or the like, and a textile grid reinforcement manufactured through high temperature thermal treatment is effectively used to newly construct or reinforce a concrete structure.

Further, since the textile grid reinforcement uses fiber having higher strength than that of the conventional plastic grid, the textile grid reinforcement has high tensile strength and low tensile strain so as to have excellent structural material properties for constructing and reinforcing structures.

FIG. 2 is a detailed view illustrating a structure of the textile reinforced concrete shown in FIGS. 1A to 1C, and FIG. 3 is a detailed view for describing occurrence of slipping and a crack of a textile reinforced concrete according to the related art.

As shown in FIG. 2, a planar grid is widely used in construction and civil engineering fields, particularly, as a reinforcement material of a lightweight and thin layer structure, wherein the planar grid is formed as a textile grid 32 produced by weaving high strength fiber, such as glass fiber, carbon fiber, and basalt fiber, into high strength fiber.

A textile reinforced concrete constructed using a textile grid 32 is used for building members and thin civil engineering structures due to lightweight properties, however, since the textile reinforced concrete structure is alternately tensed and compressed due to a bending moment, the textile grid reinforcements may be disposed in two layers.

Typically, the textile reinforced cement composite 30 is expected to have load-resistant performance and seismic performance of the structure by securing bending performance and tensile performance by textile reinforcement, however, in the textile reinforced cement composite 30 according to the related art, it is difficult to secure enough bending performance and tensile performance to be sufficient to be used as the conventional reinforcement bar reinforced concrete 10.

As shown in FIG. 3, when a load is applied, slipping of the textile grid reinforcement 32 occurs due to weak adhesion performance on an interface between the textile grid reinforcement 32 and the cement composite 31, and a crack occurs on the cement composite 31 in a longitudinal direction and a transverse direction, and thus the textile reinforced cement composite 30 may be broken.

Meanwhile, FIG. 4 is a view illustrating a correlation between load/bending and a crack in a textile reinforced cement composite, and FIG. 5 is a view illustrating a correlation between tension and a crack in the textile reinforced cement composite.

As shown in FIGS. 4 and 5, when concrete is manufactured only using the textile grid reinforcement 32 and a cement binder, strength is sharply decreased after an initial crack when a flexural tensile force is applied, multiple cracks occur, and the cracks proceed, and thus the cement composite may be broken.

Particularly, slipping may occur on an interface due to coating of a surface of a textile grid reinforcement, and a method of coating a textile grid reinforcement with a coating material, such as an epoxy or a material having a rough surface, may be used to prevent slipping between the textile grid reinforcement and the cement composite but requires an additional process of coating with a coating material, and thus there is a problem in that time and costs are additionally required.

PRIOR ART DOCUMENTS

[Patent Documents] (Patent Document 0001) Korean Registered Patent No. 10-1772625 (Registered on Aug. 23, 2017), Title of Invention: "Inorganic Composite for Concrete Structure Reinforcement and Method of Reinforcing Concrete Structure Using the Same"

(Patent Document 0002) Korean Registered Patent No. 10-1207038 (Registered on Nov. 26, 2012), Title of Invention: "Ultra High Performance Fiber Reinforced Cement Composite with Fine Glass Powder and Manufacturing Method Thereof"

(Patent Document 0003) Korean Registered Patent No. 10-1958243 (Registered on Mar. 8, 2019), Title of Invention: "Method of Manufacturing Three-Dimensional Textile Reinforcement and Method of Constructing Textile Reinforced Concrete Structure Using the Same"

(Patent Document 0004) Korean Registered Patent No. 10-2003670 (Registered on Jul. 19, 2019), Title of Invention: "Textile Reinforced Concrete Structure Using Textile Grid Fixing Device and Construction Method Thereof"

(Patent Document 0005) Korean Laid-open Patent Application No. 2005-18744 (Published on Feb. 28, 2005), Title of Invention: "Method of Manufacturing Hybrid-Type High Toughness Cement Composite Reinforced with Micro and Macro Fibers"

(Patent Document 0006) Korean Laid-open Patent Application No. 2004-79629 (Published on Sep. 16, 2004), Title of Invention: "Method of Manufacturing Staple Fiber Reinforced High Toughness Cement Composite Material"

SUMMARY OF THE INVENTION

The present invention is directed to providing a textile reinforced cement composite for suppressing occurrence of slipping and a crack which suppresses slipping between a textile grid reinforcement and a cement composite and occurrence of a crack of a cement composite using an angulated filling material mixed therewith when a textile reinforced cement composite formed by embedding a textile grid reinforcement in a cement composite is manufactured.

The present invention is also directed to providing a textile reinforced cement composite for suppressing occurrence of slipping and a crack which suppresses occurrence of a crack of the cement composite due to a fiber bridging reaction using organic fiber mixed therewith and induces distribution of fine cracks when a textile reinforced cement composite formed by embedding a textile grid reinforcement in a cement composite is manufactured.

The present invention is also directed to providing a textile reinforced cement composite for suppressing occurrence of slipping and a crack which suppresses degradation of fluidity of the cement composite caused by mixing of the angulated filling material using a spherical binder and a chemical admixture added thereto when a textile reinforced cement composite formed by embedding a textile grid reinforcement in a cement composite is manufactured.

According to an aspect of the present invention, there is provided a textile reinforced cement composite for suppressing occurrence of slipping and a crack which includes a cement composite formed by mixing a fine powder binder, an angulated filling material, and an organic fiber with cement so that slipping occurring on an interface with a textile grid reinforcement and a crack are suppressed, and the textile grid reinforcement embedded and disposed in the cement composite to reinforce the cement composite, wherein the cement composite is formed by mixing 100 parts by weight of cement, 40 to 60 parts by weight of a spherical binder, 10 to 30 parts by weight of a fine powder binder, 180 to 225 parts by weight of general sand, 75 to 120 parts by weight of an angulated filling material, 55 to 75 parts by weight of mixing water, 0.5 to 2.5 parts by weight of organic fiber, and 0.1 to 0.3 parts by weight of a chemical admixture, the angulated filling material suppresses slipping between the textile grid reinforcement and the cement composite and occurrence of a crack of the cement composite, the fine powder binder has a predetermined particle size and suppresses slipping between the textile grid reinforcement and the cement composite, and the organic fiber suppresses occurrence of a crack of the cement composite due to a fiber bridging reaction and induces distribution of fine cracks.

An entirety of the filling material may include the angulated filling material at 25 to 45% and the general sand at 60 to 75%, and the angulated filling material is partially replaced with the general sand.

The angulated filling material may be angulated sand or glass powder having distribution of grain shape of 45 to 52%, and the general sand has a particle size of 1 to 5 mm.

The organic fiber, which is a staple fiber selected from polyvinyl alcohol (PVA) fiber, polypropylene (PP) fiber, polyethylene (PE) fiber, glass fiber, or nylon fiber, may suppress occurrence of a crack of the cement composite (110) due to the fiber bridging reaction and may induce distribution of fine cracks.

The spherical binder, which is a binder that suppresses degradation of fluidity of the cement composite caused by use of the angulated filling material, may include at least one selected from fly ash, silica fume, and lightweight bead.

The chemical admixture may suppress degradation of fluidity of the cement composite caused by use of the angulated filling material and may include at least one selected from a superplasticizer, a water reducing admixture, and a high range water reducing admixture.

The fine powder binder may be a binder that has an average particle size of 2 to 10 μm to suppress slipping between the textile grid reinforcement and the cement composite.

The fine powder binder may include at least one selected from fine glass powder, fine silica powder, and fine limestone powder.

The textile grid reinforcement may be embedded in the cement composite and formed by weaving glass fiber, carbon fiber, or aramid fiber.

According to an aspect of the present invention, there is provided a method of manufacturing a textile reinforced cement composite for suppressing occurrence of slipping and a crack which includes a) arranging a textile grid reinforcement on a form having a predetermined shape, b) forming a binder including cement, a spherical binder, and a fine powder binder, c) forming a filling material including general sand and an angulated filling material, d) forming cement paste for a cement composite by mixing the binder, the filling material, mixing water, and a chemical admixture, e) mixing organic fiber with the cement paste, f) pouring the cement paste mixed with the organic fiber on the textile grid reinforcement in the form, and g) curing and drying the poured cement paste to complete the textile reinforced cement composite having the textile grid reinforcement embedded in the cement composite, wherein the angulated filling material suppresses slipping between the textile grid reinforcement and the cement composite and occurrence of a crack of the cement composite, the fine powder binder has a predetermined particle size and suppresses slipping between the textile grid reinforcement and the cement composite, and the organic fiber suppresses occurrence of a crack of the cement composite due to a fiber bridging reaction and induces distribution of fine cracks.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 7 is a view illustrating an example of a mixing ratio of a cement composite in the textile reinforced cement composite for suppressing occurrence of slipping and a crack according to the embodiment of the present invention;

DETAILED DESCRIPTION OF EXEMPLARY EMBODIMENTS

Figure 1A:
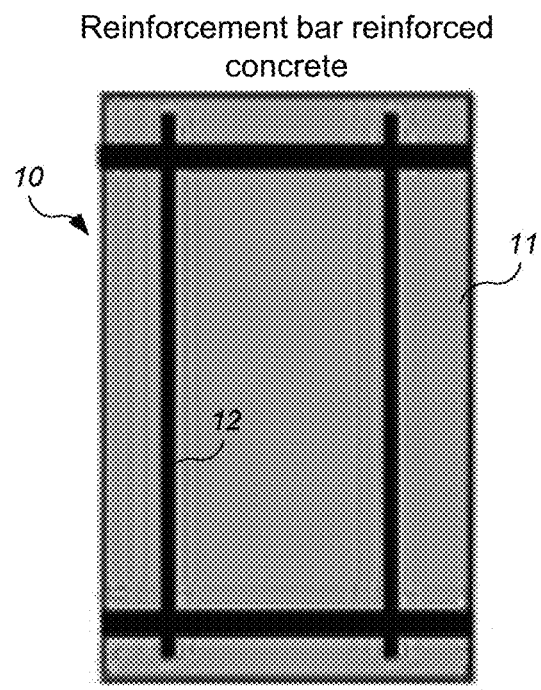
FIGS. 1A to 1C shows schematic views illustrating reinforcement bar reinforced concrete, fiber reinforced concrete, and textile reinforced concrete.
Figure 1B:
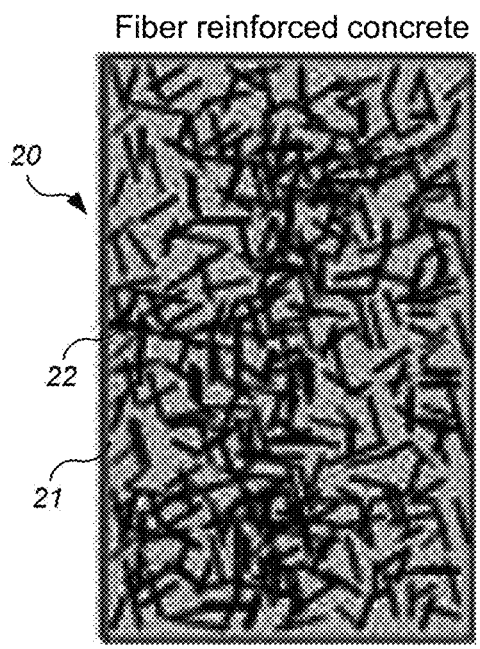
Figure 1C:
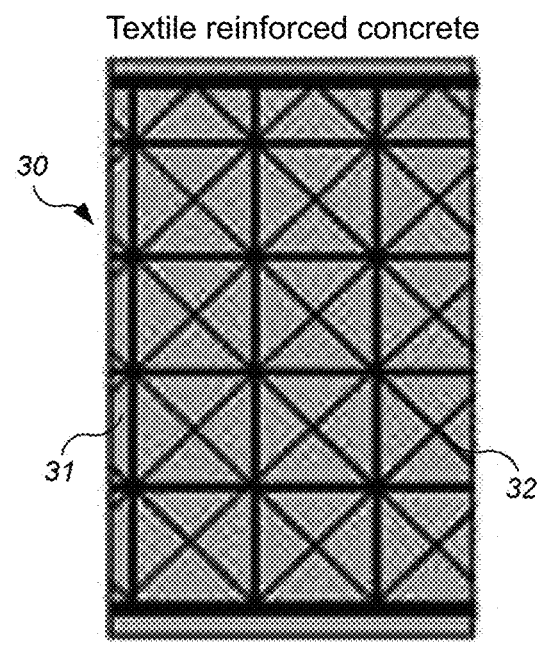
Figure 2:
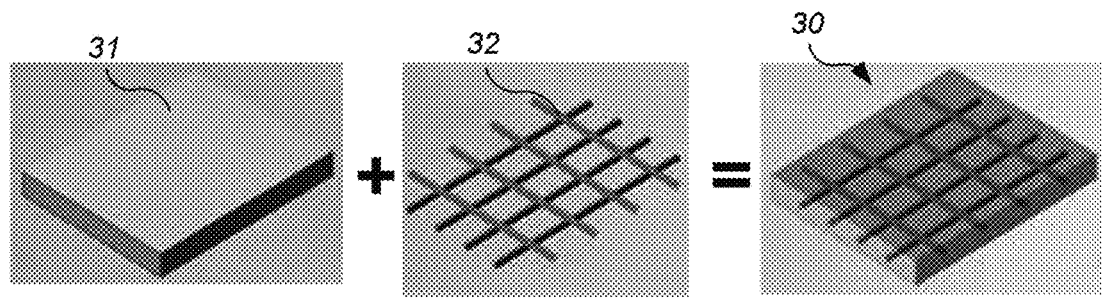
FIG. 2 is a detailed view illustrating a structure of the textile reinforced concrete shown in FIGS. 1A to 1C.
Figure 3:
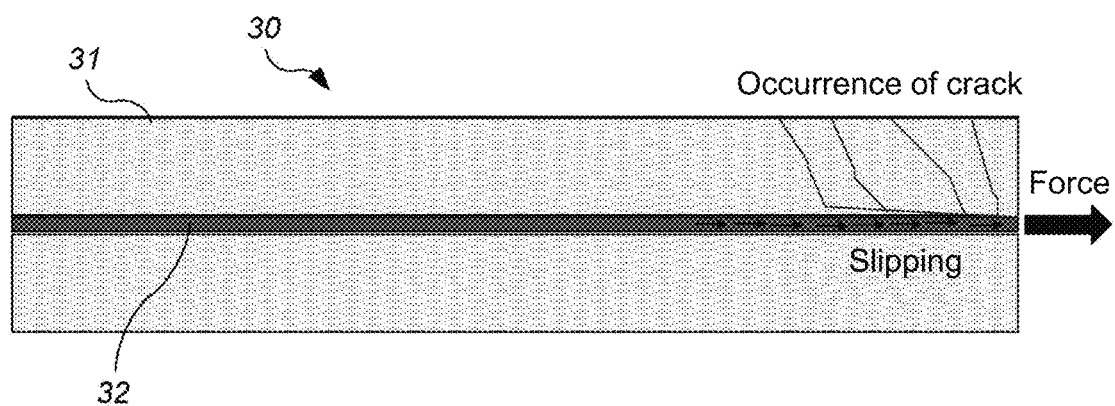
FIG. 3 is a detailed view for describing occurrence of slipping and a crack of a textile reinforced concrete according to a related art.
Figure 4:
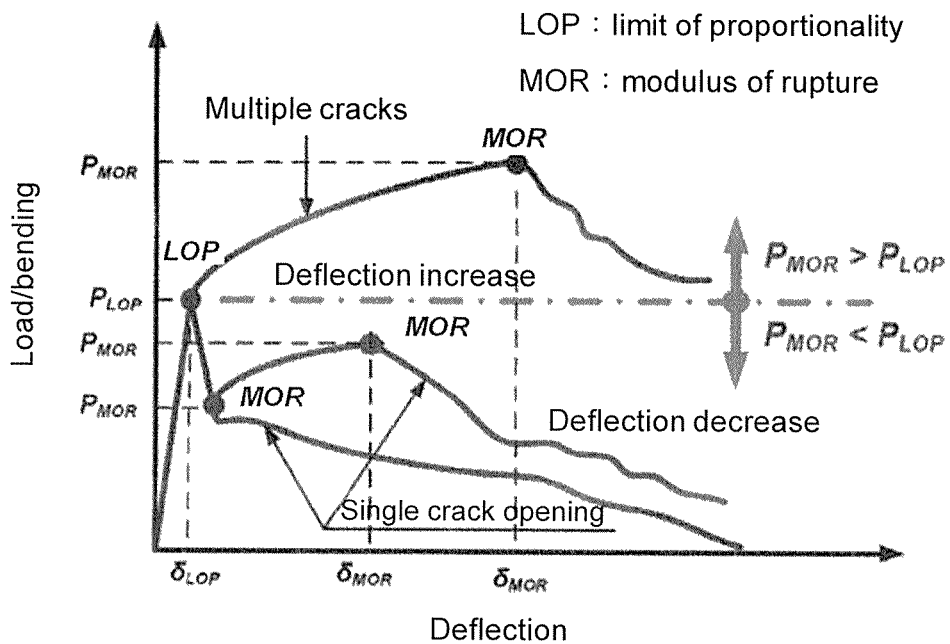
FIG. 4 is a view illustrating a correlation between load/bending and a crack in a textile reinforced cement composite.

Hereinafter, embodiments that are easily performed by those skilled in the art will be described in detail with reference to the accompanying drawings. However, the embodiments of the present invention may be implemented in several different forms and are not limited to embodiments described herein. In addition, parts irrelevant to description will be omitted in the drawings to clearly explain the embodiments of the present invention. Similar parts are denoted by similar reference numerals throughout this specification.

Throughout the specification, when a portion "includes" an element, the portion may include the element or another element may be further included therein unless otherwise described.

[Textile Reinforced Cement Composite 100 for Suppressing Occurrence of Slipping and Crack]

Figure 6:
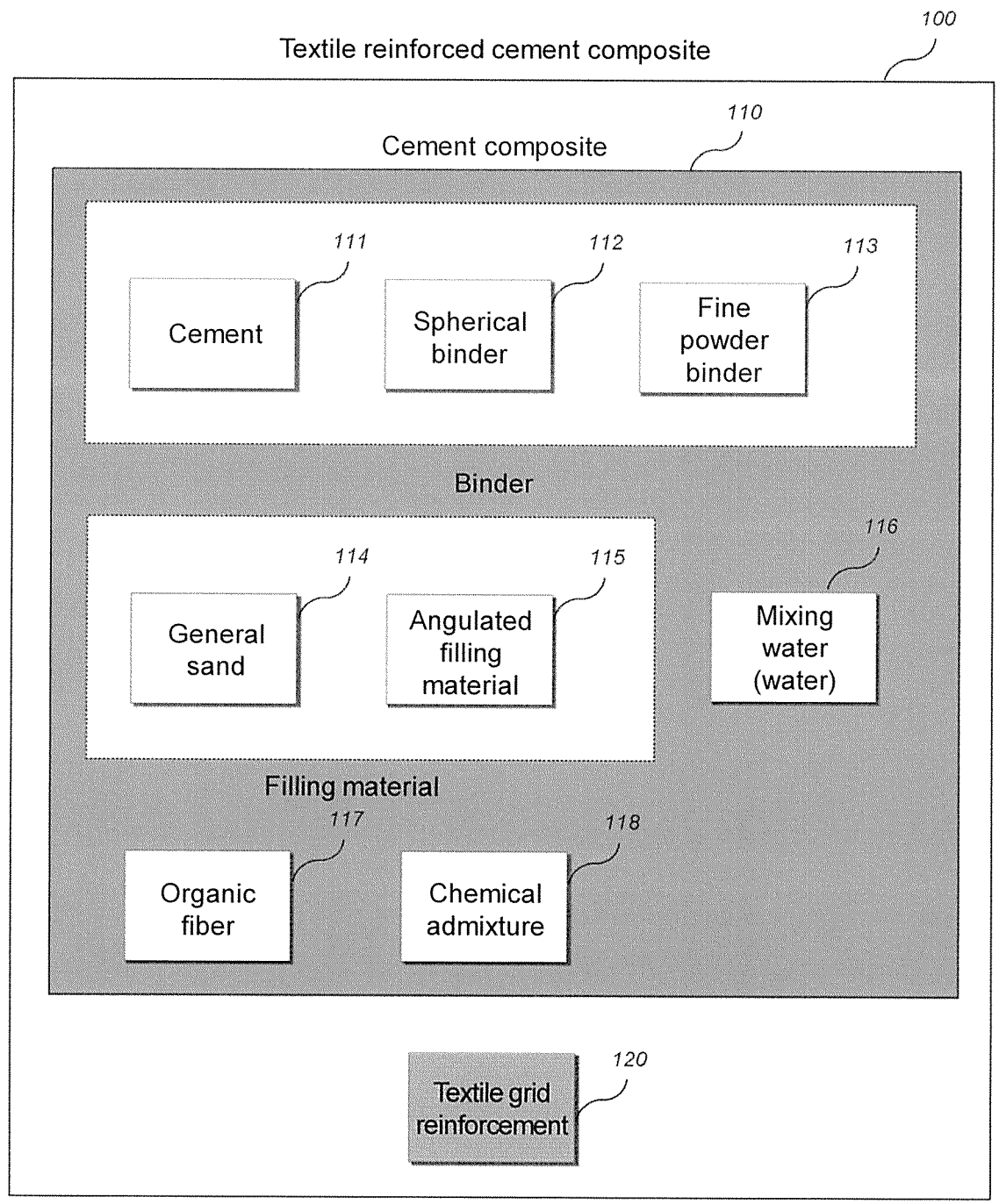
FIG. 6 is a schematic configuration view illustrating a textile reinforced cement composite for suppressing occurrence of slipping and a crack according to an embodiment of the present invention.

FIG. 6 is a schematic configuration view illustrating a textile reinforced cement composite for suppressing occurrence of slipping and a crack according to an embodiment of the present invention, and FIG. 7 is a view illustrating an example of a mixing ratio of a cement composite in the textile reinforced cement composite for suppressing occurrence of slipping and a crack according to the embodiment of the present invention.

As shown in FIGS. 6 and 7, the textile reinforced cement composite 100 for suppressing occurrence of slipping and a crack according to the embodiment of the present invention includes a cement composite 110 and a textile grid reinforcement 120, wherein the cement composite 110 is formed by mixing 100 parts by weight of cement 111, 40 to 60 parts by weight of a spherical binder 112, 10 to 30 parts by weight of a fine powder binder 113, 180 to 225 parts by weight of general sand 114, 75 to 120 parts by weight of an angulated filling material 115, 55 to 75 parts by weight of mixing water 116, 0.5 to 2.5 parts by weight of organic fiber 117, and 0.1 to 0.3 parts by weight of a chemical admixture 118.

The cement composite 110 of the textile reinforced cement composite for suppressing occurrence of slipping and a crack is formed by mixing the fine powder binder 113, the angulated filling material 115, the organic fiber 117, and the like with the cement 111 so that slipping on an interface with the textile grid reinforcement 120 and a crack are suppressed.

The textile grid reinforcement 120 is disposed to be embedded in the cement composite 110 so as to reinforce the cement composite 110. For example, the textile grid reinforcement 120 is embedded in the cement composite 110 and may be formed by weaving glass fiber, carbon fiber, or aramid fiber.

Specifically, the angulated filling material 115 of the cement composite 110 suppresses slipping between the textile grid reinforcement 120 and the cement composite 110 and a crack of the cement composite 110. In this case, an entirety of the filling material is formed of an angulated filling material 115 at 25 to 45% and general sand 114 at 60 to 75%, and the angulated filling material 115 is partially replaced with the general sand 114. Further, the angulated filling material 115 may be angulated sand or glass powder having distribution of grain shape of 45 to 52%, and the general sand 114 may have a particle size of 1 to 5 mm.

Further, the organic fiber 117 suppresses occurrence of a crack due to a fiber bridging reaction and induces distribution of fine cracks. For example, the organic fiber 117, which is a staple fiber selected from polyvinyl alcohol (PVA) fiber, polypropylene (PP) fiber, polyethylene (PE) fiber, glass fiber, and nylon fiber, may suppress occurrence of a crack due to the fiber bridging reaction and induce distribution of fine cracks. That is, when the textile grid reinforcement 120 is applied as a replacement of a conventional reinforced concrete, organic fiber 117, such as glass fiber, carbon fiber, aramid fiber, or the like is applied to the cement composite 110, and thus the crack of the cement composite 110 can be prevented from proceeding due to the fiber bridging reaction.

Further, the spherical binder 112, which is a material binder that suppresses degradation of fluidity of the cement composite 110, may include at least one selected from fly ash, silica fume, and lightweight bead. Further, the chemical admixture 118 suppresses degradation of fluidity of the cement composite 110 and may include at least one selected from a superplasticizer, a water reducing admixture, and a high range water reducing admixture.

Further, the fine powder binder 113 of the cement composite 110 has a predetermined particle size and suppresses occurrence of slipping between the textile grid reinforcement 120 and the cement composite 110, and the fine powder binder 113 may be a binder having an average particle size of 2 to 10 μm to suppress slipping between the textile grid reinforcement 120 and the cement composite 110, for example, the fine powder binder 113 may include at least one selected from fine glass powder, fine silica powder, and fine limestone powder.

Therefore, in the textile reinforced cement composite 100 according to the embodiment of the present invention, the cement composite 110 is mixed with the angulated filling material 115, such as angulated sand or glass powder, the fine powder binder 113, such as fine silica powder or fine limestone powder, or the organic fiber 117, such as PVA or PP, to suppress slipping between the textile grid reinforcement 120 and the cement composite 110 and a crack of the cement composite 110 so as to secure toughness of the cement composite 110. Further, the spherical binder 112, such as fly ash or silica fume, is further mixed with the chemical admixture 118, such as a water reducing admixture or a superplasticizer, to compensate for degradation of fluidity of the cement composite 110 caused by use of the angulated filling material 115.

Figure 8A:
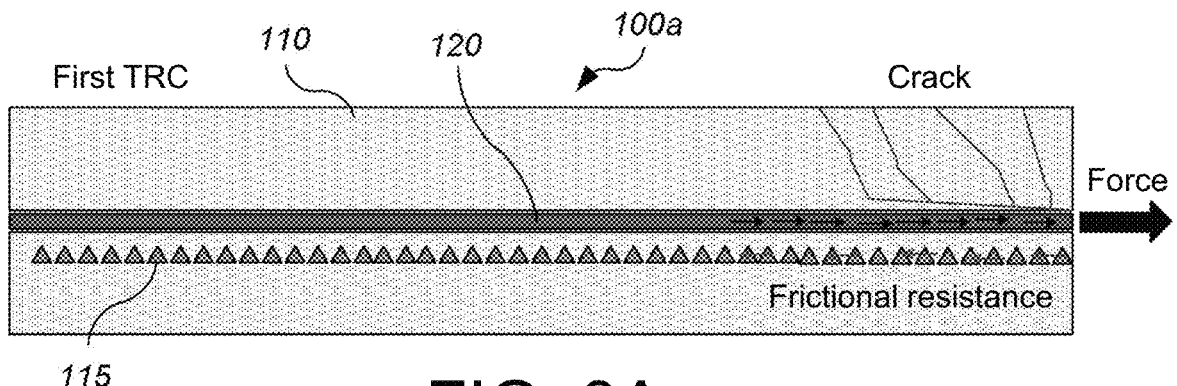
FIGS. 8A to 8C shows cross-sectional views illustrating textile reinforced cement composites for suppressing occurrence of slipping and a crack according to the embodiment of the present invention.
Figure 8B:
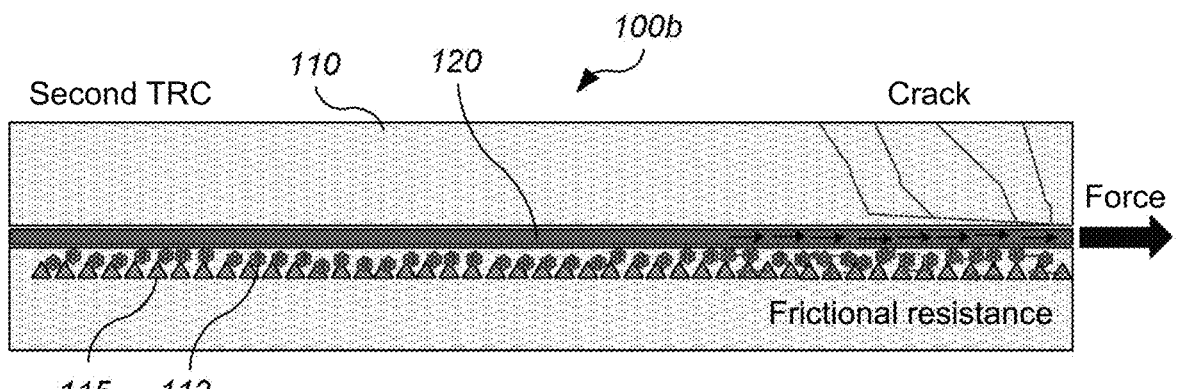
Figure 8C:
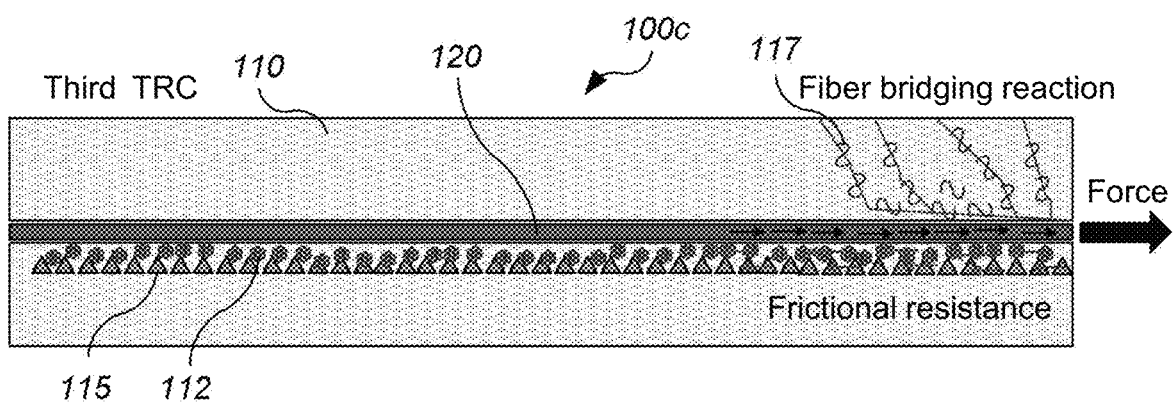

Meanwhile, FIGS. 8A to 8C shows cross-sectional views illustrating textile reinforced cement composites for suppressing occurrence of slipping and a crack according to the embodiment of the present invention, wherein FIG. 8A shows a first textile reinforced cement (TRC) 100a using the angulated filling material, FIG. 8B shows a second TRC 100b additionally using the spherical binder and the chemical admixture, and FIG. 8C shows a third TRC 100c additionally using the organic fiber.

TABLE 1

| Classification | | Textile reinforced cement (TRC) composite | | |
|---|---|---|---|---|
| | | First TRC | Second TRC | Third TRC |
| Binder | Cement | ○ | ○ | ○ |
| | Spherical binder | — | ○ | ○ |
| | Fine powder binder | — | — | ○ |
| Filling material | General sand | ○ | ○ | ○ |
| | Angulated filling material | ○ | ○ | ○ |
| Mixing water (water) | | ○ | ○ | ○ |
| Organic fiber | | — | — | ○ |
| Chemical admixture | | — | ○ | ○ |
| Textile grid reinforcement | | ○ | ○ | ○ |

First, the textile reinforced cement composite 100 according to the embodiment of the present invention is a noncorrosive cement composite to which the textile grid reinforcement 120 is applied, wherein the textile grid reinforcement 120 is fabric woven formed of a composite material, such as glass fiber, carbon fiber, or aramid fiber, and is applicable as a replacement of a conventional reinforcement bar or reinforcement mesh. The cement composite 110 that forms the textile reinforced cement composite 100 is similar to conventional cement mortar or cement concrete that generally includes cement, a mineral admixture, sand, and a chemical admixture, and, in some cases, further includes coarse aggregate.

Specifically, as shown in FIG. 8A and Table 1, the textile reinforced cement composite 100 for suppressing occurrence of slipping and a crack according to the embodiment of the present invention is mixed with the angulated filling material 115, such as angulated sand and silica powder having a predetermined particle size, so as to suppress slipping between the textile grid reinforcement 120 and the cement composite 110 and a crack of the cement composite 110 caused by the slip.

In other words, in the case of the textile reinforced cement composite 100 according to the embodiment of the present invention, when the cement composite 110 is mixed, the angulated filling material 115, such as the angulated sand or glass powder, is partially used as a replacement of the general sand 114 to suppress the slipping between the textile grid reinforcement 120 and the cement composite 110 using the fine powder binder 113.

For example, in the case of the angulated filling material 115, which is 25 to 40% of an entirety of the filling material, the angulated sand or glass powder having distribution of grain shape of 45 to 52% is mixed with the general sand. That is, an entirety of the filling material includes the general sand 114 at 60 to 75% and the angulated filling material 115 at 25 to 40%, and thus the angulated filling material 115 may be partially replaced with the general sand 114. That is, to suppress slipping and a crack of the textile reinforced cement composite according to the embodiment of the present invention from proceeding, the cement composite is mixed with the angulated filling material 115 having a predetermined particle size, and in this case, angulated sand or glass powder having distribution of grain shape in a range of 45 to 52% may be used as the angulated filling material 115.

Further, the fine powder binder 113 having an average particle size of 2 to 10 μm, such as fine glass powder, fine silica powder, or fine limestone powder, may be used to further increase an effect of slipping prevention using the angulated filling material 115, and in this case, the fine powder binder 113 of 10 to 30 parts by weight with respect to 100 parts by weight of the cement 111 may be used. In this case, the fine powder binder 113 may be fine glass powder, fine silica powder, fine limestone powder, or the like.

As shown in FIG. 8B and Table 1, in the case of the textile reinforced cement composite 100 according to the embodiment of the present invention, the angulated filling material 115 causes a problem of degradation of liquidity of the cement composite 110, and thus both the spherical binder 112 and the chemical admixture 118 may be used to solve the problem. In this case, fly ash, silica fume, lightweight bead, or the like may be used as the spherical binder 112, and a superplasticizer, a water reducing admixture, a high range water reducing admixture, or the like may be used as the chemical admixture 118.

As shown in FIG. 8C and Table 1, the organic fiber 117, such as PVA fiber, PP fiber, PE fiber, glass fiber, nylon fiber, or the like, is used to form the cement composite 110, and thus occurrence of a crack of the cement composite 110 can be suppressed due to a bridge action of fiber, and distribution of fine cracks can be induced. For example, when the organic fiber 117 having an average particle size of 2 to 10 μm is used, occurrence of cracks can be suppressed due to a bridge action of the organic fiber 117.

Figure 5:
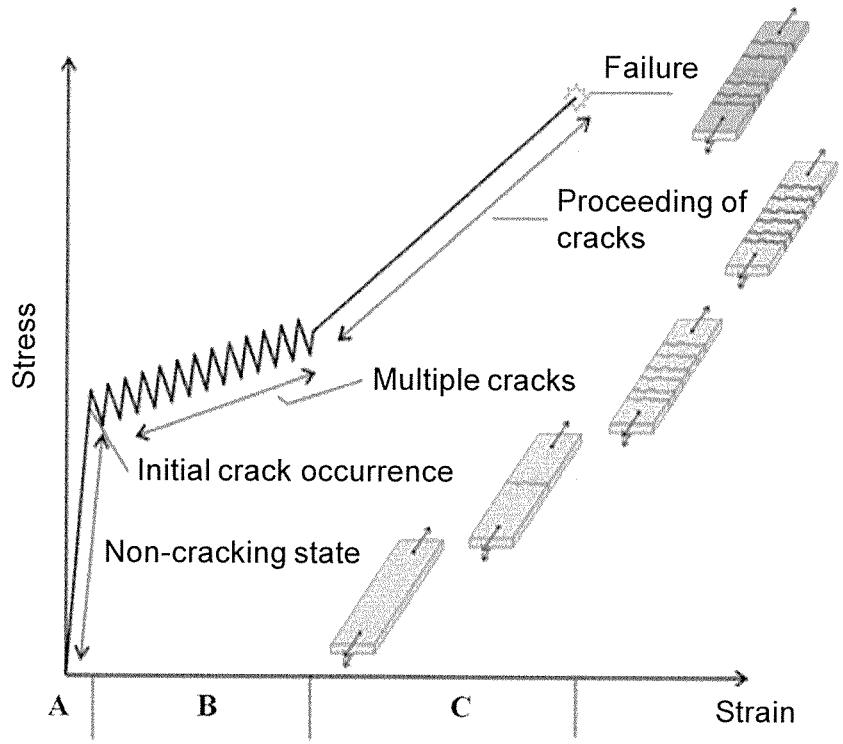
FIG. 5 is a view illustrating a correlation between tension and a crack in the textile reinforced cement composite.

In other words, in the textile reinforced cement composite 100 according to the embodiment of the present invention, as shown in FIG. 5, when a tensile force exceeds tensile strength, a crack occurs so that slipping between the textile grid reinforcement 120 and the cement composite 110 proceeds further. When the crack of the cement composite 110 proceeds, a structure formed as the cement composite 110 is lead to fail. In this case, when the cement composite 110 is formed, organic fiber 117 at 0.5 to 2.5%, such as PVA, PP, PE, glass, or nylon fiber, is mixed with the cement composite 110 to prevent a crack from proceeding due to the fiber bridging reaction, and thus a ductile behavior of the textile reinforced cement composite 100 according to the embodiment of the present invention can be increased. In this case, the organic fiber 117 may be a staple fiber that has a short length.

Figure 9:
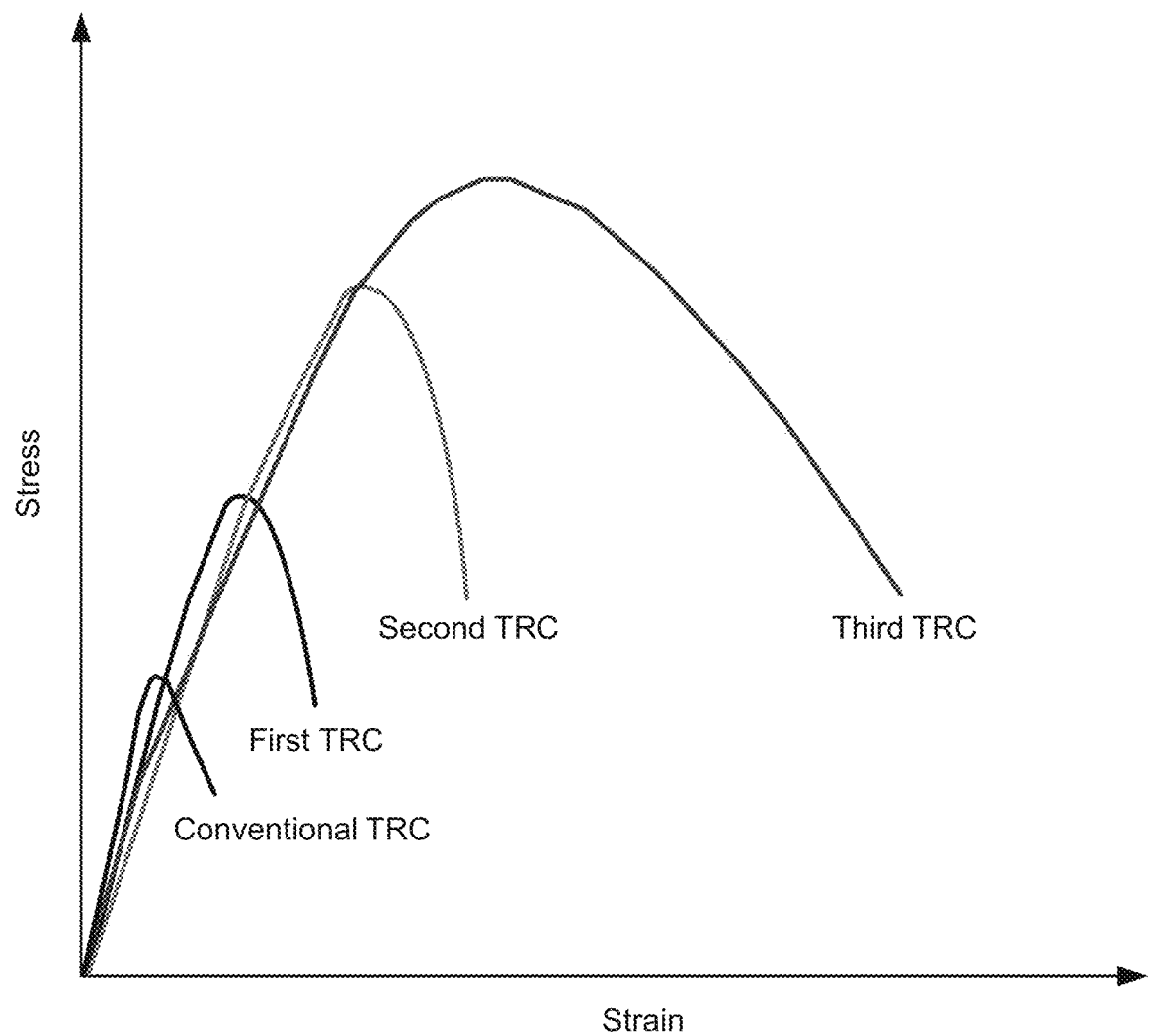
FIG. 9 is a view illustrating a correlation between strain and stress of the textile reinforced cement composite for suppressing occurrence of slipping and a crack according to the embodiment of the present invention.

Meanwhile, FIG. 9 is a view illustrating a correlation between strain and stress of the textile reinforced cement composite for suppressing occurrence of slipping and a crack according to the embodiment of the present invention.

As shown in FIG. 9, it is confirmed that the first TRC 100a, the second TRC 100b, and the third TRC 100c may suppress slipping and a crack increasingly more than the conventional TRC in a sequential order.

Finally, in the textile reinforced cement composite 100 according to the embodiment of the present, the angulated filling material is mixed when the textile reinforced cement composite having the textile grid reinforcement embedded in the cement composite is manufactured, and thus slipping between the textile grid reinforcement and the cement composite and occurrence of a crack of the cement composite can be suppressed.

Further, in the case of the textile reinforced cement composite 100 according to the embodiment of the present invention, the organic fiber is mixed to suppress a crack of the cement composite caused by the fiber bridging reaction and induce distribution of fine cracks. Further, in the textile reinforced cement composite 100 according to the embodiment of the present invention, a spherical binder and a chemical admixture are added to suppress degradation of fluidity of the cement composite caused by the mixing of the angulated filling material, and a fine powder binder having a predetermined particle size is mixed therein to suppress slipping between the textile grid reinforcement and the cement composite.

[Method of Manufacturing Textile Reinforced Cement Composite 100 for Suppressing Occurrence of Slipping and Crack]

Figure 10:
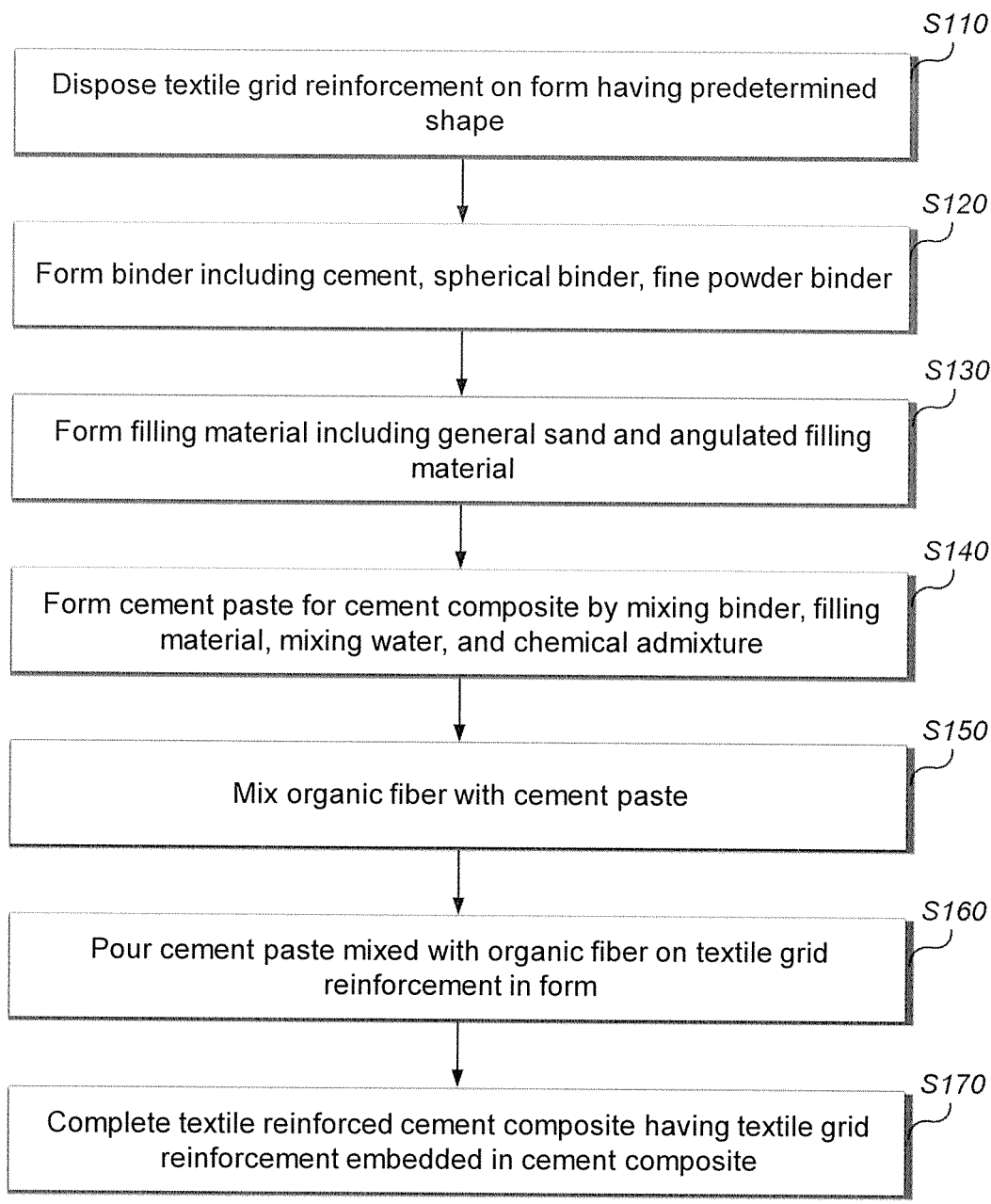
FIG. 10 is a flowchart illustrating a method of manufacturing a textile reinforced cement composite for suppressing occurrence of slipping and a crack according to the embodiment of the present invention.

FIG. 10 is a flowchart illustrating a method of manufacturing a textile reinforced cement composite for suppressing occurrence of slipping and a crack according to the embodiment of the present invention.

Referring to FIG. 10, in the method of manufacturing a textile reinforced cement composite for suppressing occurrence of slipping and a crack according to the embodiment of the present invention, first, a textile grid reinforcement 120 is disposed on a form having a predetermined shape (S110). For example, the textile grid reinforcement 120 is embedded in a cement composite 110 and may be formed by weaving glass fiber, carbon fiber, or aramid fiber.

Next, a binder is formed including cement 111, a spherical binder 112, and a fine powder binder 113 (S120). In this case, the fine powder binder 113 has a predetermined particle size and suppresses slipping between the textile grid reinforcement 120 and the cement composite 110. In this case, the fine powder binder 113 may be a binder having an average particle size of 2 to 10 µm to suppress slipping between the textile grid reinforcement 120 and the cement composite 110, for example, the fine powder binder 113 may include at least one selected from fine glass powder, fine silica powder, and fine limestone powder, but the present invention is not limited thereto.

Further, the spherical binder 112, which is a binder that suppresses degradation of fluidity of the cement composite 110, may include at least one selected from the fly ash, silica fume, and lightweight bead, but the present invention is not limited thereto.

Next, a filling material is formed including a general sand 114 and an angulated filling material 115 (S130). In this case, the angulated filling material 115 serves to suppress slipping between the textile grid reinforcement 120 and the cement composite 110 and a crack of the cement composite 110. Further, an entirety of the filling material includes the angulated filling material 115 at 25 to 45% and the general sand 114 at 60 to 75%, and the angulated filling material 115 is partially replaced with the general sand 114, wherein the angulated filling material 115 may be replaced with the general sand 114. In this case, the angulated filling material 115 may be angulated sand or glass powder having distribution of grain shape of 45 to 52%, and the general sand 114 may have a particle size of 1 to 5 mm.

Next, cement paste for the cement composite 110 is formed by mixing the binder, the filling material, a mixing water 116, and a chemical admixture 118 (S140). In this case, the chemical admixture 118 suppresses degradation of fluidity of the cement composite 110 and may include at least one selected from a superplasticizer, a water reducing admixture, and a high range water reducing admixture, but the present invention is not limited thereto.

Next, the cement paste is mixed with the organic fiber 117 (S150). In this case, the organic fiber 117 suppresses a crack of the cement composite 110 due to a fiber bridging reaction and induces distribution of fine cracks. For example, the organic fiber 117, which is a staple fiber selected from PVA fiber, PP fiber, PE fiber, glass fiber, or nylon fiber, may suppress a crack of the cement composite 110 due to a fiber bridging reaction and induce distribution of fiber cracks.

Next, the cement paste mixed with the organic fiber 117 is poured on the textile grid reinforcement 120 in a form (S160). Therefore, the cement composite 110 is formed by mixing 100 parts by weight of the cement 111, 40 to 60 parts by weight of the spherical binder 112, 10 to 30 parts by weight of the fine powder binder 113, 180 to 225 parts by weight of the general sand 114, 75 to 120 parts by weight of the angulated filling material 115, 55 to 75 parts by weight of the mixing water 116, 0.5 to 2.5 parts by weight of the organic fiber 117, and 0.1 to 0.3 parts by weight of the chemical admixture 118.

Next, the poured cement paste is dried and cured, and the textile reinforced cement composite 100 having the textile grid reinforcement 120 embedded in the cement composite 110 is completed (S170).

Figure 11:
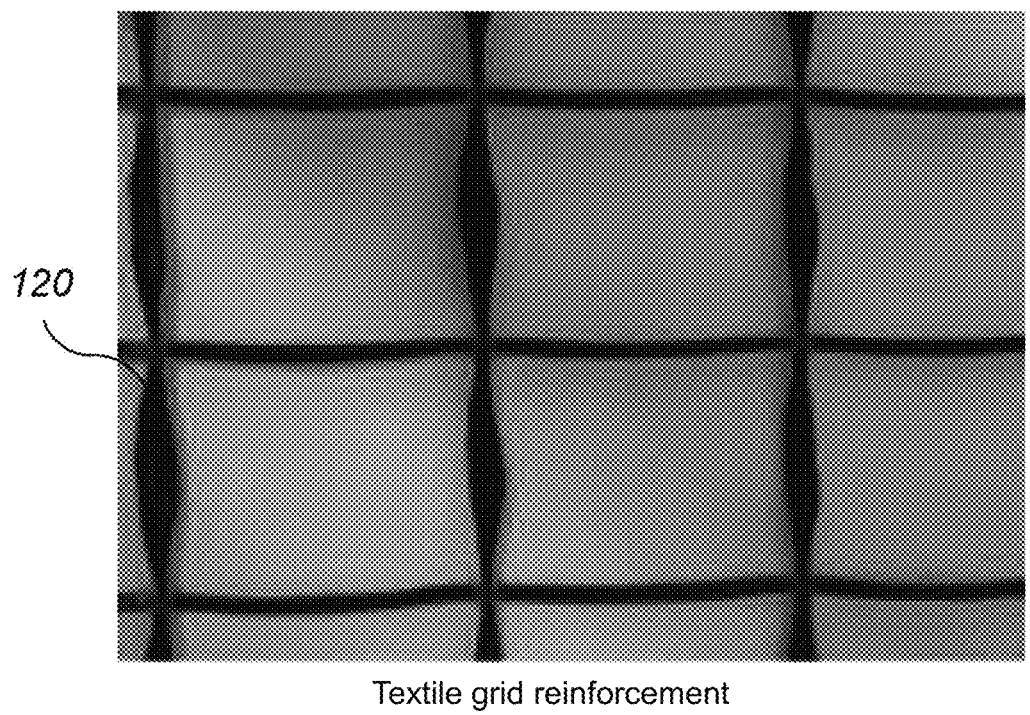
FIG. 11 is a view illustrating an example of a textile grid reinforcement material in the textile reinforced cement composite for suppressing occurrence of slipping and a crack according to the embodiment of the present invention.
Figure 12:
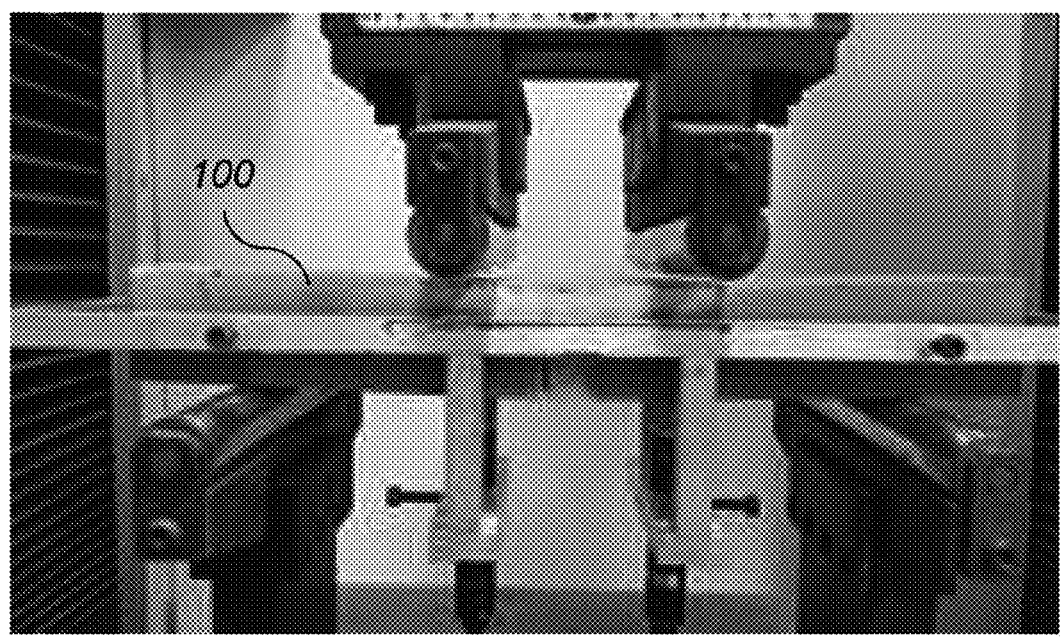
FIG. 12 is a view illustrating a testing device for the textile reinforced cement composite for suppressing occurrence of slipping and a crack according to the embodiment of the present invention.

Meanwhile, FIG. 11 is a view illustrating an example of a textile grid reinforcement material in the textile reinforced cement composite for suppressing occurrence of slipping and a crack according to the embodiment of the present invention, and FIG. 12 is a view illustrating a testing device for the textile reinforced cement composite for suppressing occurrence of slipping and a crack according to the embodiment of the present invention.

As shown in FIG. 11, in the textile reinforced cement composite for suppressing occurrence of slipping and a crack according to the embodiment of the present invention, the textile grid reinforcement 120 may be produced by weaving high strength fiber, such as glass fiber, carbon fiber, or basalt fiber, into a lattice form.

The textile reinforced cement composite 100 for suppressing occurrence of slipping and a crack according to the embodiment of the present invention is manufactured as the third TRC 100c, and a flexural tensile strength thereof can be evaluated by a testing device shown in FIG. 5.

Figure 13:
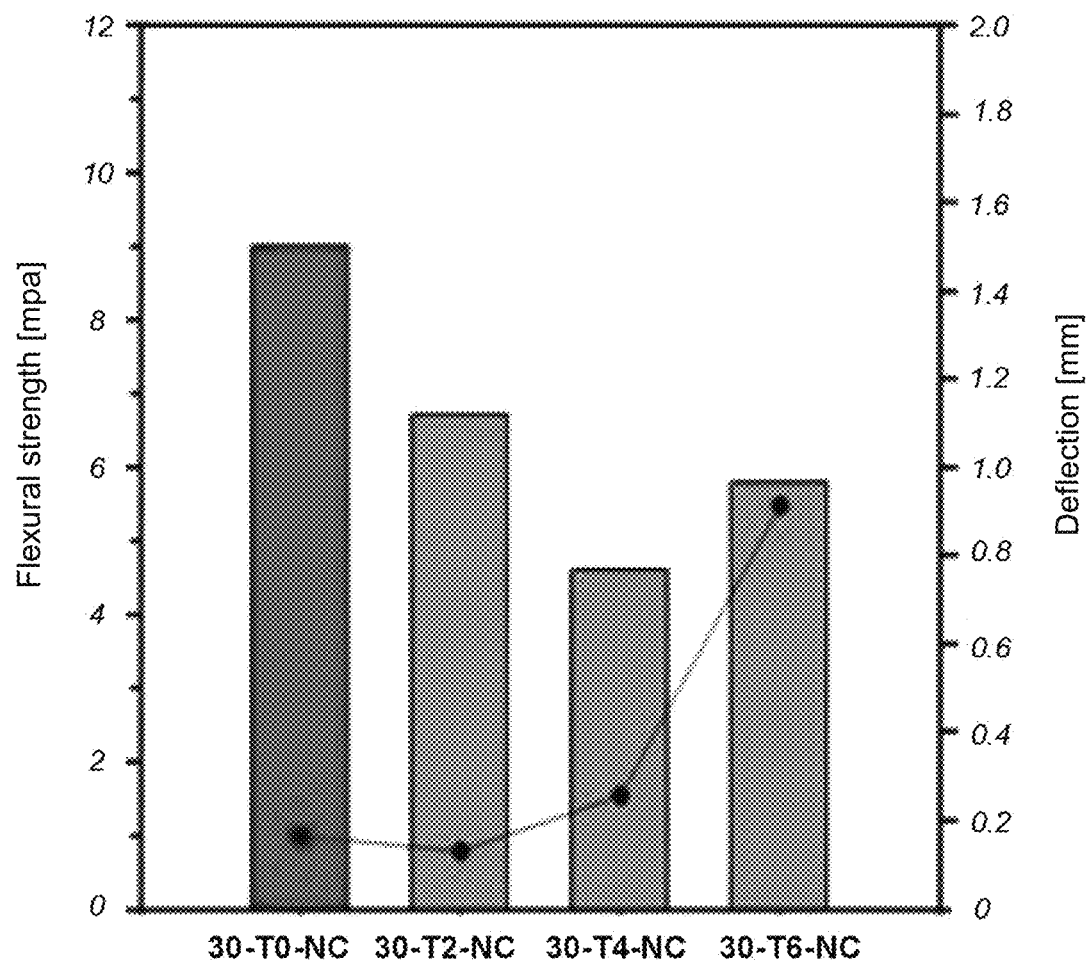
FIG. 13 is a view illustrating a flexural tensile strength of the textile reinforced cement composite for suppressing occurrence of slipping and a crack according to the embodiment of the present invention.
Figure 14:
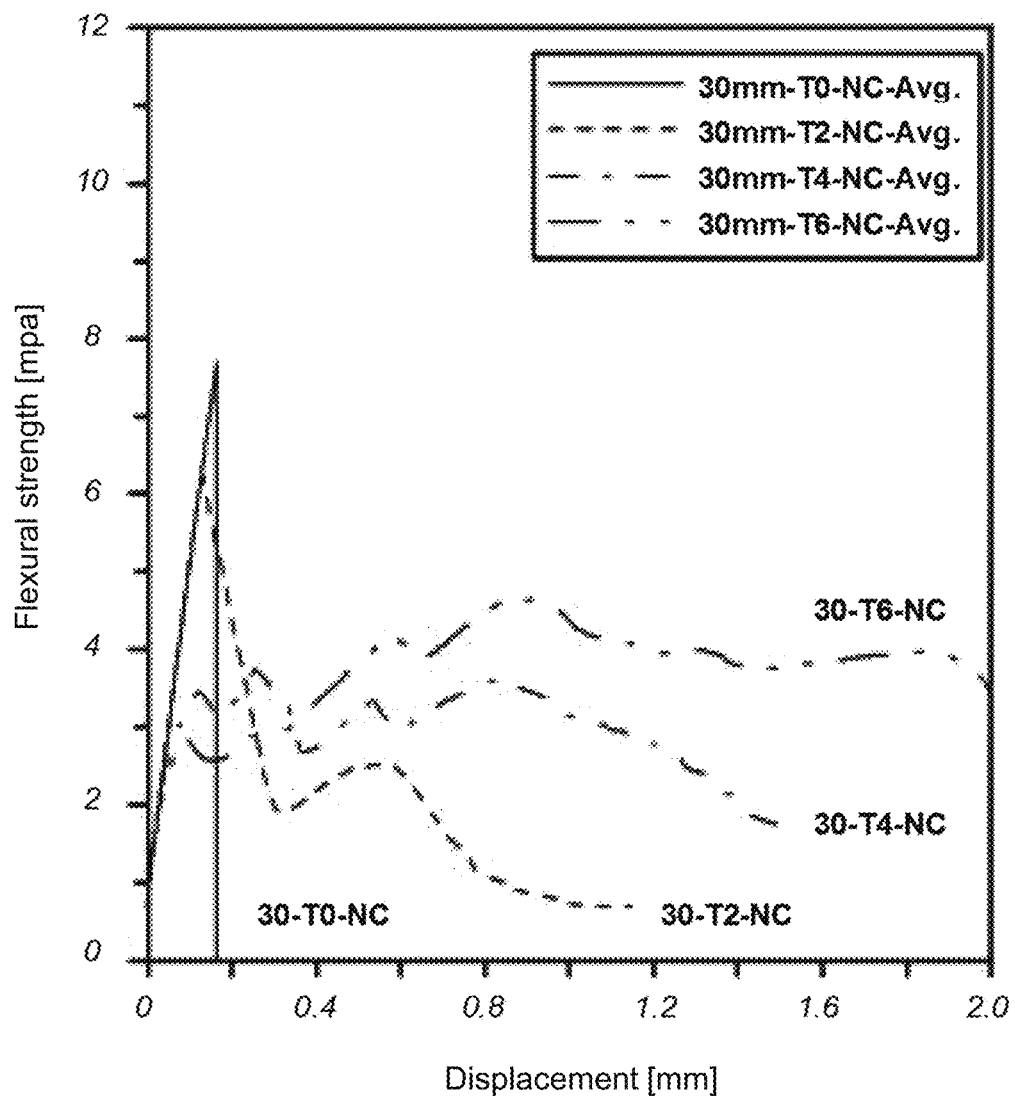
FIG. 14 is a view illustrating a flexural tensile behavior of the textile reinforced cement composite for suppressing occurrence of slipping and a crack according to the embodiment of the present invention.

Meanwhile, FIG. 13 is a view illustrating flexural tensile strength of the textile reinforced cement composite for suppressing occurrence of slipping and a crack according to the embodiment of the present invention, and FIG. 14 is a view illustrating a flexural tensile behavior of the textile reinforced cement composite for suppressing occurrence of slipping and a crack according to the embodiment of the present invention.

Flexural tensile strength of the textile reinforced cement composite 100 for suppressing occurrence of slipping and a crack according to the embodiment of the present invention is as shown in FIG. 13, and further, a flexural tensile behavior thereof is as shown in FIG. 14, and thus it is confirmed that slipping and a crack of the textile reinforced cement composite 100 are suppressed.

Meanwhile, it has been described that the textile reinforced cement composite 100 according to the embodiment of the present invention has the above-described mixing ratio, but it is obvious to those skilled in the art that the mixing ratio and the like may vary according to use of the cement composite, for example, when high performance concrete or ultra-high performance concrete is formed.

Further, the textile reinforced cement composite 100 for suppressing occurrence of slipping and a crack according to the embodiment of the present invention may be applied to a building exterior material, a culvert, an underground structure, concrete pavement, a sewage treatment facility, an offshore bridge, tunnel lining, a port structure, a concrete caisson foundation, covering of a sewer pipe, and improvement and repairing of chemical resistance.

According to the present invention, when a textile reinforced cement composite having a textile grid reinforcement embedded in a cement composite is manufactured, an angulated filling material is mixed with the textile reinforced cement composite, and thus slipping between a textile grid reinforcement and a cement composite can be suppressed and occurrence of a crack of a cement composite can be suppressed.

According to the present invention, organic fiber is mixed with textile reinforced cement composite, and thus occurrence of a crack of the cement composite can be suppressed due to a fiber bridging reaction and distribution of fine cracks can be induced.

According to the present invention, a spherical binder and a chemical admixture are added to the textile reinforced cement composite, and thus degradation of fluidity of the cement composite caused by mixing of the angulated filling material can be suppressed.

According to the present invention, the fine powder binder having a predetermined particle size is mixed with the textile reinforced cement composite, and thus slipping between the textile grid reinforcement and the cement composite can be suppressed.

The above description of the present invention is only exemplary, and it should be understood by those skilled in the art that the invention may be performed in other concrete forms without changing the technological scope and essential features. Therefore, the above-described embodiments should be considered as only examples in all aspects and not for purposes of limitation. For example, each component described as a single type may be realized in a distributed manner, and similarly, components that are described as being distributed may be realized in a coupled manner.

The scope of the present invention is defined not by the detailed description but by the appended claims and encompasses all modifications or alterations derived from meanings, the scope, and equivalents of the appended claims.

What is claimed is:

1. A textile reinforced cement composite for suppressing occurrence of slipping and a crack, the textile reinforced cement composite comprising:
   a cement composite formed by mixing a fine powder binder, an angulated filling material, and an organic fiber with cement so that slipping on an interface with a textile grid reinforcement and occurrence of a crack are suppressed; and
   the textile grid reinforcement embedded and disposed within the cement composite to reinforce the cement composite, wherein the textile grid reinforcement is formed by weaving glass fiber, carbon fiber, aramid fiber, or basalt fiber, into a form having a predetermined shape,
   wherein the cement composite is formed by mixing 100 parts by weight of the cement, 40 to 60 parts by weight of a spherical binder, 10 to 30 parts by weight of the fine powder binder, 180 to 225 parts by weight of general sand, 75 to 120 parts by weight of the angulated filling material, 55 to 75 parts by weight of mixing water, 0.5 to 2.5 parts by weight of the organic fiber, and 0.1 to 0.3 parts by weight of a chemical admixture,
   the angulated filling material suppresses slipping between the textile grid reinforcement and the cement composite and occurrence of a crack of the cement composite,
   the fine powder binder has a predetermined particle size and suppresses slipping between the textile grid reinforcement and the cement composite, and
   the organic fiber, which is a staple fiber selected from polyvinyl alcohol (PVA) fiber, polyethylene (PE) fiber, glass fiber, or nylon fiber, suppresses occurrence of a crack of the cement composite due to a fiber bridging reaction and induces distribution of fine cracks,
   wherein the angulated filling material is angulated sand or glass powder having distribution of grain shape of 45 to 52%, and wherein the general sand has a particle size of 1 to 5 mm.

2. The textile reinforced cement composite of claim 1, wherein an entirety of the filling material includes the angulated filling material at 25 to 45% and the general sand at 60 to 75%, and the angulated filling material is partially replaced with the general sand.

3. The textile reinforced cement composite of claim 1, wherein the spherical binder, which is a binder that suppresses degradation of fluidity of the cement composite caused by use of the angulated filling material, includes at least one selected from fly ash, silica fume, and lightweight bead.

4. The textile reinforced cement composite of claim 1, wherein the chemical admixture suppresses degradation of fluidity of the cement composite caused by use of the angulated filling material and includes at least one selected from a superplasticizer, a water reducing admixture, and a high range water reducing admixture.

5. The textile reinforced cement composite of claim 1, wherein the fine powder binder is a binder that has an average particle size of 2 to 10 μm to suppress slipping between the textile grid reinforcement and the cement composite.

6. The textile reinforced cement composite of claim 5, wherein the fine powder binder includes at least one selected from fine glass powder, fine silica powder, and fine limestone powder.

7. A method of manufacturing a textile reinforced cement composite for suppressing occurrence of slipping and a crack, the method comprising:
- a) arranging a textile grid reinforcement on a form having a predetermined shape;
- b) forming a binder including cement, a spherical binder, and a fine powder binder;
- c) forming a filling material including general sand and an angulated filling material;
- d) forming cement paste for a cement composite by mixing the binder, the filling material, mixing water, and a chemical admixture;
- e) mixing organic fiber with the cement paste;
- f) pouring the cement paste mixed with the organic fiber on the textile grid reinforcement in the form; and
- g) curing and drying the poured cement paste to complete the textile reinforced cement composite having the textile grid reinforcement embedded within the cement composite, wherein the textile grid reinforcement is formed by weaving glass fiber, carbon fiber, aramid fiber, or basalt fiber, into the form having the predetermined shape, wherein the angulated filling material suppresses slipping between the textile grid reinforcement and the cement composite and occurrence of a crack of the cement composite, the fine powder binder has a predetermined particle size and suppresses slipping between the textile grid reinforcement and the cement composite, and the organic fiber, which is a staple fiber selected from polyvinyl alcohol (PVA) fiber, polyethylene (PE) fiber, glass fiber, or nylon fiber, suppresses occurrence of a crack of the cement composite due to a fiber bridging reaction and induces distribution of fine cracks, wherein the angulated filling material is angulated sand or glass powder having distribution of grain shape of 45 to 52%, and wherein the general sand has a particle size of 1 to 5 mm.

8. The method of claim 7, wherein the cement composite is formed by mixing 100 parts by weight of the cement, 40 to 60 parts by weight of the spherical binder, 10 to 30 parts by weight of the fine powder binder, 180 to 225 parts by weight of the general sand, 75 to 120 parts by weight of the angulated filling material, 55 to 75 parts by weight of the mixing water, 0.5 to 2.5 parts by weight of the organic fiber, and 0.1 to 0.3 parts by weight of the chemical admixture.

9. The method of claim 8, wherein an entirety of the filling material includes the angulated filling material at 25 to 45% and the general sand at 60 to 75%, and the angulated filling material is partially replaced with the general sand.

10. The method of claim 8, wherein the spherical binder, which is a binder that suppresses degradation of fluidity of the cement composite caused by use of the angulated filling material, include at least one selected from fly ash, silica fume, and lightweight bead.

11. The method of claim 8, wherein the chemical admixture suppresses degradation of fluidity of the cement composite caused by use of the angulated filling material and includes at least one selected from a superplasticizer, a water reducing admixture, and a high range water reducing admixture.

12. The method of claim 8, wherein the fine powder binder is a binder that has an average particle size of 2 to 10 μm to suppress slipping between the textile grid reinforcement and the cement composite.

13. The method of claim 12, wherein the fine powder binder includes at least one selected from fine glass powder, fine silica powder, and fine limestone powder.

* * * * *